United States Patent
Djordjevic

(10) Patent No.: US 6,477,893 B1
(45) Date of Patent: Nov. 12, 2002

(54) ERODABLE SENSOR FOR PROGRESSIVE BRAKE WEAR DETECTION

(75) Inventor: Miomir Blagoje Djordjevic, Milwaukee, WI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/658,018

(22) Filed: Sep. 8, 2000

(51) Int. Cl.$^7$ .............................................. F16D 66/02
(52) U.S. Cl. .................................... 73/129; 188/1.11 L
(58) Field of Search ............. 73/121, 129; 188/1.11 R, 188/1.11 W, 1.11 L, 1.11 E

(56) References Cited

U.S. PATENT DOCUMENTS

| | | | |
|---|---|---|---|
| 2,981,929 A | | 4/1961 | Rizzo et al. |
| 3,825,891 A | * | 7/1974 | Kinast |
| 3,958,445 A | * | 5/1976 | Howard et al. |
| 4,606,434 A | * | 8/1986 | Vasilow et al. |
| 4,606,435 A | * | 8/1986 | Johnson |
| 5,133,431 A | * | 7/1992 | Braun ..................... 188/1.11 L |
| 5,559,286 A | | 9/1996 | White et al. |
| 5,637,794 A | * | 6/1997 | Hanisko |
| 5,816,370 A | * | 10/1998 | Verbeeten et al. ...... 188/1.11 L |
| 6,250,429 B1 | * | 6/2001 | Kramer |
| 6,360,850 B1 | * | 3/2002 | Odisho et al. .......... 188/1.11 L |
| 6,366,201 B1 | * | 4/2002 | Hanisko ................ 188/1.11 E |

* cited by examiner

Primary Examiner—Eric S. McCall
(74) Attorney, Agent, or Firm—Liniak, Berenato & White

(57) ABSTRACT

A progressive brake lining wear having a triangular wedged shaped resistive member disposed between a pair of conductive plates to define a triangular shaped sensor. The sensor is disposed within an erodable molding and connected to a sensing circuit. A pair of leads are connected one each to a ground lead and a resistive lead which in turn are connected to a closed sensing circuit. The ground lead and resistance lead and thermistor lead emerge from the encapsulated sensor for connection to the sensing circuit. The sensor is disposed within the brake lining and is connected to the brake shoe. As the brake lining progressively wears, the triangular wedged shaped resistive member is progressively worn away thus continuously changing the overall resistance of the sensor. The change in resistance provides for continuous indicates of the state of wear.

15 Claims, 2 Drawing Sheets

ERODABLE SENSOR FOR PROGRESSIVE BRAKE WEAR DETECTION

BACKGROUND OF THE INVENTION

1. Field of the Invention

The present invention is directed to a brake lining wear sensor and is more particularly directed to a modular progressive brake lining wear sensor.

2. Summary of the Prior Art

Various brake lining wear detection systems are known in the art. In addition, temperature measurement systems are known. One such temperature and wear detection technique monitors the resistance of a temperature sensitive resistor yielding a signal which represents the operating temperature of the brake lining so that extreme temperature conditions can be detected and corrective action taken. Once the electrical conductive loop is worn away, an open circuit is detected which signals the need for lining replacement.

One method to detect brake lining employs an embedded conductive wire loop within the brake lining. When the loop is broken and furthermore, when electrical contact is made between the wire loop and a brake drum surface, lining wear out is detected. Another brake wear and temperature measurement system utilizes a plurality of thermo-responsive elements disposed within the brake lining where each element is selectively monitored to determine if abnormal temperatures have been encountered and/or whether the brake lining has worn to such an extent that one or more of the thermally responsive elements have been broken.

It is an object of the present invention to provide a simple progressive break wear sensor in a single compact erodable element.

SUMMARY OF THE INVENTION

The present invention is directed to a modular progressive brake lining wear sensor. A sensor has a triangular wedged shaped resistive member disposed between a pair of conductive plates to define a triangular shaped sensor. The sensor is disposed within an erodable molding and connected to a sensing circuit. A pair of leads are connected one each to a ground lead and a resistive lead which in turn are connected to a closed sensing circuit. The ground lead and resistance lead emerge from the encapsulated sensor for connection to the sensing circuit. The sensor is disposed within the brake lining and is connected to the brake shoe. As the brake lining progressively wears, the triangular wedged shaped resistive member is progressively worn away thus continuously changing the overall resistance of the sensor. The change in resistance provides for continuous indication of the state of wear of the brake lining.

DESCRIPTION OF THE PREFERRED EMBODIMENT

Figure 1:
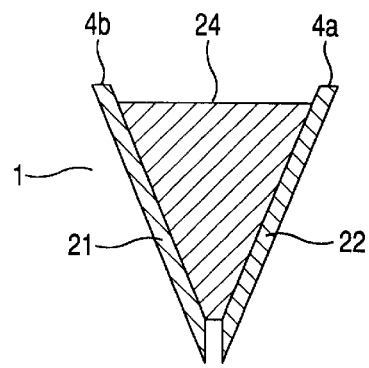
FIG. 1 is a sectional view of the brake lining sensor according to the present invention.
Figure 2:
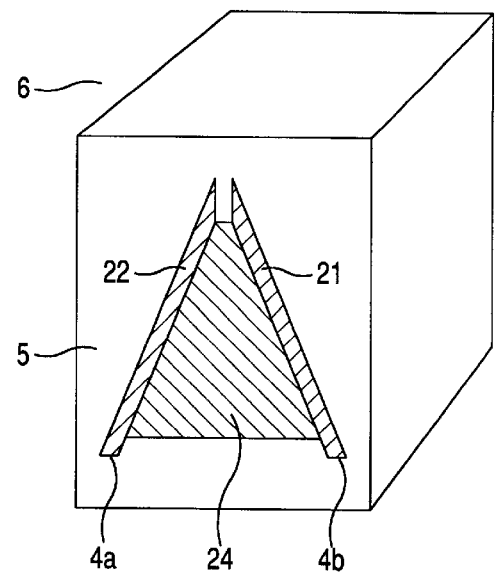
FIG. 2 is a sectional of the brake lining sensor embedded within an erodable element.
Figure 3:
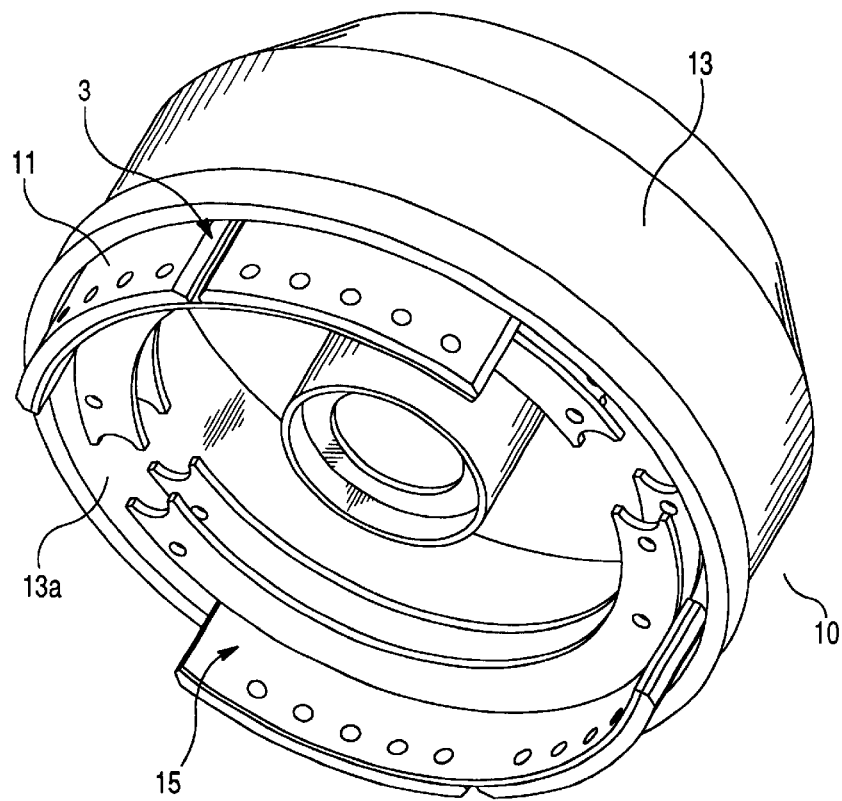
FIG. 3 is a perspective view of a drum brake assembly incorporating the brake sensor of the present invention.

FIG. 1 depicts a brake wear sensor 1. The sensor 1 is preferably disposed between adjacent portions of a drum brake lining 11 as shown in FIG. 3 indicated by arrow 3. The sensor 1 includes a triangular wedged shaped resistor 24 disposed between a pair of conductor plates 21, 22 to define a triangular shaped sensor. The entire sensor 1 is preferably embedded or encapsulated within a thermoset or thermoplastic molding to define a modular erodable element as shown in FIG. 2. The modular erodable element may then be simply installed between or within a brake lining to detect wear. A pair of leads 4a, 4b are connected to a respective one of the conductive plates 21, 22 and emerge from the sensor 1 for connection to a closed sensing or control circuit 30.

The triangular wedge shaped resistor 24 acts like an infinite series of paralleled connected resistors. The entire triangular wedge shaped resistor 24 will initially have a relatively low resistance. However, as the resistor is worn and the tip of the resistor is removed the resistance increases. The sensing/control circuit 30 need only be calibrated to coordinate the change in resistance with the linear wear of the sensor 1. Since the sensor 1 wears at the same rate as the lining, the amount of lining wear may easily be detected.

The conductive plates 21, 22 may be formed of metal or a highly conductive polymer ceramic. The triangular wedge shaped resistor 24 may be formed of a low conductive material such as ceramic or a polymer. Other material may also be employed so long as there is a significant difference between the conductive properties of the conductive plates and the triangular wedged shaped resistor.

The sensor 1 is preferably oriented such that the tip is oriented toward the drum brake surface 13a. As the brake lining 11 wears, the sensor 1 continuously and progressively wears away. Consequently, the overall resistance of the sensor 1 continuously changes. The change in resistance is detected by the sensing/control circuit 30 to determine and indicate present state of wear. One of ordinary skill in the art is capable of programming a sensing circuit to detect the change in resistance as taught by the present invention and further elaboration of the sensing circuit is not warranted.

When the brake lining 11 is new, or before the sensor 1 is worn, the initial resistance will indicate minimal or no wear. As the sensor 1 wears, the resistance correspondingly increases indicating wear. Once the sensor 1 is completely worn, the circuit is severed and the resistance approaches infinity. Consequently, severe wear is detected indicating the necessity for brake lining replacement.

The present invention is preferably employed in a drum brake assembly 10 as shown in FIG. 3. However, the modular sensor 1 may also be employed in other brake assemblies. Referring now to FIG. 3, a brake drum 13 has an internal brake surface 13a for frictionally engaging the brake lining 11. An actuator such as an S-cam arrangement displaces the brake shoes 15 towards the brake surface 13a. Brake linings 11 are mounted to the brake shoe 15 to frictionally engage the brake drum 13 and thus provide a braking force. The generic brake drum arrangement 10 and actuation is well known in the art.

The modular erodable element 6 is preferably mounted between a pair of brake lining surfaces 11 (as generally shown by arrow 3) with a terminal end adjacent or substantially flush with the outer surface of the brake lining 11. The specific connection to the brake shoe 15 is not shown. However, the specific connection is not critical to the present invention. Any suitable connection that maintains radial alignment of the sensor 1 during braking may be employed. Barbs may extend through the sensor 1 to engage a bore in the brake shoe or a clip separately secured to the brake shoe 15. Other types of connections of are also contemplated by the present invention.

Figure 4:
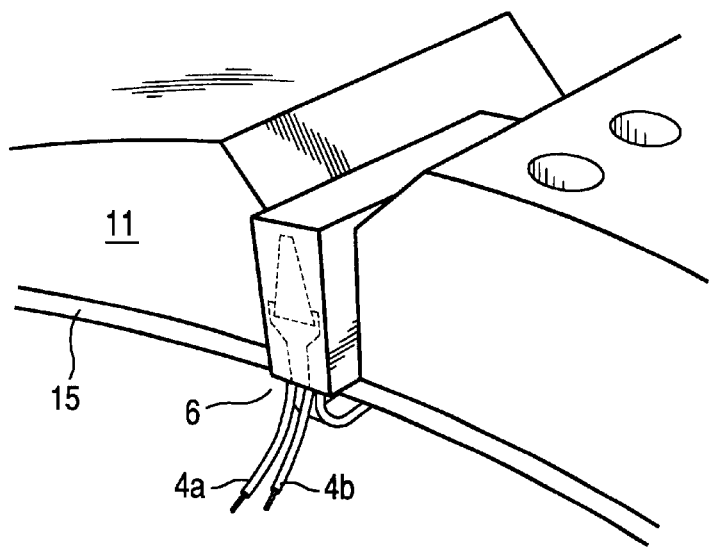
FIG. 4 is a perspective view of the sensor of FIG. 2 attached to a brake assembly.

FIG. 4 is a perspective view of the preferred embodiment of the present invention prior to any significant wear. The sensor 1 is simply slipped onto the brake shoe 15 between the brake lining portions 11. In this embodiment the sensor 1 may have a securement clip partially embedded within the molding 5 to establish the connection with the brake shoe 15.

Figure 5:
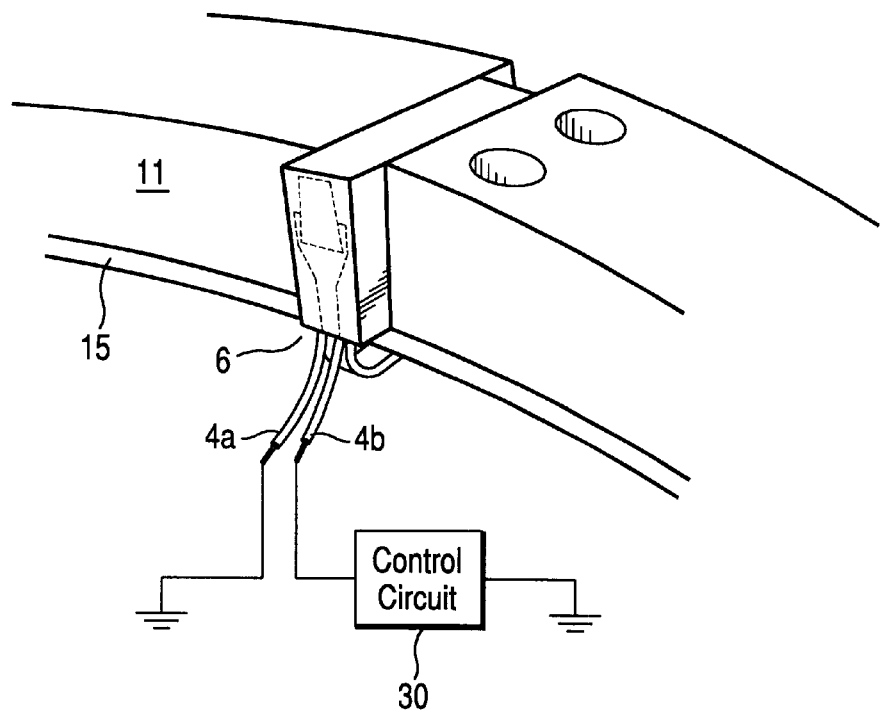
FIG. 5 is a perspective view of partially worn sensor and brake assembly of FIG. 4.

FIG. 5 is a perspective view of the brake sensor 1 of FIG. 4 in a partially worn state. As can be seen in FIG. 5, as the erodable element 6 wears, it substantially conforms to the profile of the brake lining 11. As more of the triangular shaped sensor 1 is worn, the resistance increases. Simply monitoring the progressive increase in resistance allows continuous progressive detection of brake lining wear.

While the foregoing invention has been shown and described with reference to a preferred embodiment, it will be understood by those possessing skill in the art that various changes and modifications may be made without departing from the spirit and scope of the invention.

What is claimed is:

1. A brake lining wear sensor for indicating progressive brake wear in a brake lining disposed between a brake surface and a brake actuator, said sensor comprising:

a triangular shaped sensor disposed between said brake actuator and said brake surface, said sensor being connected to a sensing circuit for detecting progressive wear of said brake lining, wherein as said brake lining progressively wears said triangular shaped sensor progressively erodes and thereby progressively changing an overall resistance in said sensing circuit to thereby indicate progressive brake lining wear; and wherein said triangular sensor comprises a pair of conductive plates and a triangular wedge shaped resistor disposed therebetween.

2. The brake lining wear sensor according to claim 1, wherein said triangular shaped sensor is encapsulated in a thermoset molding to form a modular unit.

3. The brake lining wear sensor according to claim 1, wherein said triangular shaped sensor is encapsulated in a thermoplastic molding to form a modular unit.

4. The brake lining wear sensor according to claim 1, wherein said conductive plates directly engage side surfaces of said triangular wedge shaped resistor.

5. The brake lining wear sensor according to claim 4 further comprising a pair of leads one each connected to a respective one of said conductive plates thereby connecting said sensor to said sensing circuit.

6. A modular brake lining wear sensor for indicating wear in a brake lining disposed between a brake surface and a brake actuator, said modular sensor comprising:

an encapsulated erodable element substantially disposed within said brake lining, said erodable element including;

a triangular shaped sensor embedded within said erodable element;

wherein said triangular shaped sensor is directly connected to a sensing circuit in a closed loop so that as said brake lining wears said erodable element progressively erodes thereby continuously progressively changing an overall resistance of said sensor and thereby continuously indicates progressive brake lining wear in said sensing circuit independent of any contact of said brake lining with said brake surface.

7. The brake sensor according to claim 6, wherein said triangular shaped sensor comprises:

a triangular wedged shaped resistant member disposed between a pair of conductive plates;

wherein said pair of conductive plates are connected to said sensing circuit in a closed loop so that as said brake lining wears said erodable element progressively erodes to progressively change a resistance between said conductive plates to thereby continuously indicate progressive brake lining wear in said sensing circuit.

8. The modular brake lining wear sensor according to claim 6, wherein said encapsulated erodable element is formed of a thermoset molding.

9. The modular lining wear sensor according to claim 6, wherein said encapsulated element is formed of a thermoplastic molding.

10. The brake sensor according to claim 7, said sensor further comprising a pair of leads one each connected directly to a respective one of said conductive plates.

11. The brake sensor according to claim 10, wherein said conductive plates are connected to and directly engage opposite side surfaces of said triangular wedge shaped resistor to form a modular unit.

12. A brake wear sensor for sensing wear in a brake lining, said sensor comprising;

a pair of highly conductive electrodes, a triangular wedge-shaped resistant material disposed between said pair of highly conductive electrodes forming an electrical resistance there between, and a control circuit for sensing said electrical resistance between said pair of highly conductive electrodes, wherein said resistance is indicative of brake lining wear and progressively decreases as said brake lining wears, said pair of highly conductive electrodes, said triangular wedge-shaped resistant material and said control circuit being connected in a closed circuit thereby permitting continuous sensing independent of any contact of said brake lining with a brake drum surface.

13. The brake wear sensor according to claim 12, wherein said pair of highly conductive electrodes and said triangular wedge-shaped resistant material are connected to form a modular unit.

14. The brake wear sensor according to claim 13 further comprising a pair of lead lines connected to said opposite sides of said sensor.

15. The brake wear sensor according to claim 14, wherein said conductive electrodes directly engage opposite sides of said triangular wedge-shaped resistant material, said lead lines being connected to a respective one of said conductive plates.

* * * * *